United States Patent
Elad et al.

(10) Patent No.: US 10,148,135 B2
(45) Date of Patent: Dec. 4, 2018

(54) SYSTEM, APPARATUS AND METHOD FOR AUTHENTICATING A DEVICE USING A WIRELESS CHARGER

(71) Applicant: Intel IP Corporation, Santa Clara, CA (US)

(72) Inventors: Yuval Elad, Petach-Tikva (IL); Shahar Porat, Geva Carmel (IL); Alex Nayshtut, Gan Yavne (IL)

(73) Assignee: Intel IP Corporation, Santa Clara, CA (US)

( * ) Notice: Subject to any disclaimer, the term of this patent is extended or adjusted under 35 U.S.C. 154(b) by 52 days.

(21) Appl. No.: 15/044,218

(22) Filed: Feb. 16, 2016

(65) Prior Publication Data

US 2017/0237301 A1 Aug. 17, 2017

(51) Int. Cl.
*H02J 50/80* (2016.01)
*H02J 7/02* (2016.01)
*H02J 50/10* (2016.01)

(52) U.S. Cl.
CPC .............. *H02J 50/80* (2016.02); *H02J 7/025* (2013.01); *H02J 50/10* (2016.02)

(58) Field of Classification Search
CPC .. H02J 17/00; H02J 50/80; H02J 7/025; H02J 50/10
See application file for complete search history.

(56) References Cited

U.S. PATENT DOCUMENTS

| 9,154,003 B2 * | 10/2015 | Ichikawa ............... H02J 5/005 |
| 2013/0088084 A1 * | 4/2013 | Szu ........................... H02J 1/10 307/66 |
| 2016/0087691 A1 * | 3/2016 | Van Wageningen .... H02J 5/005 307/104 |

OTHER PUBLICATIONS

Rezence, "Wireless Power and Radio Frequency," 8 pages, date unknown.
Embedded Systems Engineering,"Increasing Wireless Security with Bluetooth Low Energy," Aug. 13, 2014.
U.S. Appl. No. 14/866,617, filed Sep. 25, 2015, entitled "Powering Up a Wireless Power Receiving Device," by Yuval Elad, et al.
Mary Branscombe, "What FIDO credentials mean in Windows 10," Jan. 6, 2016, 5 pages.

* cited by examiner

*Primary Examiner* — Robert Deberadinis
(74) *Attorney, Agent, or Firm* — Trop, Pruner & Hu, P.C.

(57) ABSTRACT

In one embodiment, a computing device includes: a power receiving unit to receive energy wirelessly from a power transmitting unit via a receive coil; a load modulation logic to modulate a load coupled to the receive coil to cause a message to be transmitted to the power transmitting unit via a first channel coupled to the receive coil; and a wireless communication circuit to communicate with the power transmitting unit via a second channel. Other embodiments are described and claimed.

21 Claims, 7 Drawing Sheets

SYSTEM, APPARATUS AND METHOD FOR AUTHENTICATING A DEVICE USING A WIRELESS CHARGER

BACKGROUND

Bluetooth technology (BT) and its low power derivative Bluetooth Low Energy (BLE) are being used for the secure detection of the proximity of portable devices as part of user authentication and presence detection schemes, including multi-factor authentication schemes. Such BT/BLE solutions are performed using received signal strength indication (RSSI) measurements for device discovery and for affirming the location of the devices. This method is inaccurate and may have error margins on the order of a few meters. In addition, such schemes are susceptible to various remote spoofing attacks and may not be suitable for high security use cases.

DETAILED DESCRIPTION

Figure 1:
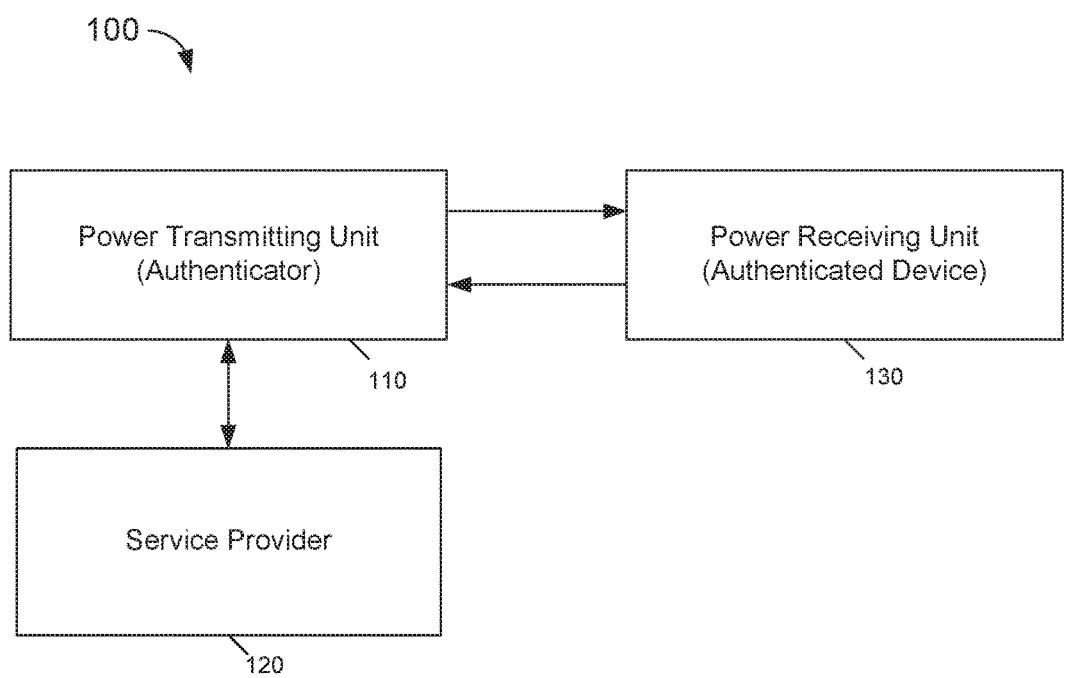
FIG. 1 is a block diagram of a system in accordance with an embodiment of the present invention.

In various embodiments, wireless charging technology may be leveraged to increase security and accuracy of device discovery and location affirming. Such wireless charging technology may be compatible with an industry specification such as the Alliance For Wireless Power (A4WP) Interoperability Specification version 1.0 (published October 2012), available from the newly designated AirFuel Alliance, www.airfuel.org. Information provided using embodiments as described herein can be used by a wide variety of authenticating computing devices and services (generically "service provider" herein) as at least one acceptance criteria for establishing a secure connection between computing devices and/or for performing an operation/action on behalf of a user of an authenticated computing device.

In addition, embodiments can operate without certain power-related concerns present in available discoverability mechanisms. For example, native BT/BLE discoverability techniques implement periodic transmission and scanning of beacon signals, which may have significant power impact both on the initiator and the responder, particularly for battery-operated devices. In addition, for these legacy techniques devices must be turned on for the authentication method to succeed. If the device is turned off, or more severely if its battery is depleted, the authentication mechanism is essentially non-functional, which can lead to denial of certain services.

Thus in various embodiments, a given wireless charging hardware infrastructure such as an A4WP-based arrangement as may be present in a portable device, may be used to implement a secure low power authentication protocol over multiple channels. In embodiments described herein, these multiple channels may be implemented as multiple wireless communication channels, including a BT or BLE-based wireless channel. For purposes of the authentication techniques described herein, this BT/BLE channel may operate as a wireless communication channel bundled with another in-band communication channel. Specifically, in an embodiment this in-band channel may be a wireless charging channel to communicate over the wireless charging power field. Understand while described with this arrangement having a wireless charging-based communication channel as an in-band channel and BT/BLE as a wireless channel, the scope of the present invention is not limited in this regard. In other examples, the wireless communication channel can be implemented using a different wireless technology such as an Institute of Electrical and Electronics Engineers (IEEE) 802.15.4 or a wireless local area network (WLAN) and the in-band channel could be implemented over different energy field technologies such as near field communication (NFC) or Qi.

At a high level, embodiments may leverage use of the following components of an A4WP hardware arrangement: BT/BLE hardware and software stack; an impedance detection mechanism for affirming physical presence of a device; in-band signaling over a wireless charging link (e.g., performed using load modulation) that can be detected by a charger unit; and power provided by the wireless charging power field, which may be used to establish a secure connection even when the device battery is completely dead.

To effect secure authentication of a mobile platform (also referred to herein as a "device"), a secure communication link between a charger and device may be established only after the charger has confirmed that the requesting device is in fact located in proximal presence to the charger itself (e.g., in contact with, or within a few inches of the charger).

Referring now to FIG. 1, shown is a block diagram of a system in accordance with an embodiment of the present invention. FIG. 1 is shown at a high level, illustrating the interaction between a power transmitting unit 110, which may act as an authenticator, and a power receiving unit 130, which in turn may act as an authenticated device (upon successful authentication by power transmitting unit 110). In addition, interaction is further shown between power transmitting unit 110 and a service provider 120. In some embodiments, connection between these two devices may be via a secure link. As such, upon successful authentication of power receiving unit 130, service provider 120 may communicate with power receiving unit 130 and/or perform some action on behalf of a user of power receiving unit 130. In some embodiments, power transmitting unit 110 may act as a bridge between power receiving unit 130 and service provider 120 to form a direct secure link between them (PTU 120 assists by sending credentials and keying material to the two entities, which allow them to securely form the new direct link between both of them).

Note that while high-level units 110, 120 and 130 are shown, understand that power transmitting unit 110 and power receiving unit 130 may be implemented, in some embodiments as a subsystem of another computing device. For example, power transmitting unit 110 may be implemented as part of a charging device or other computing device. In turn, power receiving unit 130 may be implemented as part of a computing device, such as a portable device, e.g., laptop computer, tablet computer, smartphone or so forth.

During establishment of a secure link, e.g., when the device is brought into proximal presence of the charger, the charger verifies the presence of the device by scanning for an impedance change caused by the device (e.g., using A4WP beacons) and also using BLE scans. In some embodiments, to reduce power consumption, the BLE scan is enabled only after an impedance change has been successfully detected. In order to further increase security of the detection flow, the charger and device may exchange information using a load modulation circuit, which may be implemented as part of the wireless charging hardware. This in-band signaling method can be used for transmitting device identifiers and for implementing a challenge-response protocol to significantly enhance the security of the protocol.

While various use cases are anticipated, described are several particular use cases which may be used to enable a vehicle to be unlocked, and/or powered on responsive to secure authentication of a mobile device. Other cases relate to use in connection with a wireless charging mat, e.g., for a laptop or other portable device, to provide a more secure authentication factor of a multi-factor authentication protocol.

In a first example, assume a user enters into his car and places a smartphone in or in proximity to a wireless charging boll of the car. The charging boll detects the physical presence of this specific device, and an authentication protocol is initiated. According to embodiments described herein, this protocol will succeed even if the phone's battery is dead or the phone is turned off. The protocol may leverage in-band signaling in order to further enhance the secure connection. Once a negotiation is completed successfully, the charging boll reports to a service provider (e.g., the car's main computer) that the device has been successfully detected. In turn, this service provider may allow the computer to unlock secure capabilities (e.g., allow car engine to be turned on or enable multimedia services).

As another example use case, assume a user has a laptop with wireless charger capabilities and a smartphone. The user can use the phone as part of a multi-factor authentication scheme for augmenting the security of an existing password infrastructure when performing login to a secure service, such as according to a Fast Identity Online (FIDO) Alliance protocol. In this example, similar negotiation and dual-channel authentication may proceed between the wireless charger associated with the laptop and the smartphone to provide a more secure technique for providing this given factor of a multi-factor authentication.

More specifically, in a FIDO or other next generation authentication technology, assume that a smartphone, fob or wearable device that is used to authenticate presence of a user in close relation to, e.g., a personal computer (PC) (which may include wireless charging technology such as a PTU as described herein). In such cases, the authentication protocols described herein may be used to authenticate this user device with the PC to enable unlocking of the PC and to perform various additional operations, such as authentication for websites, online financial transactions and so forth.

Figure 2:
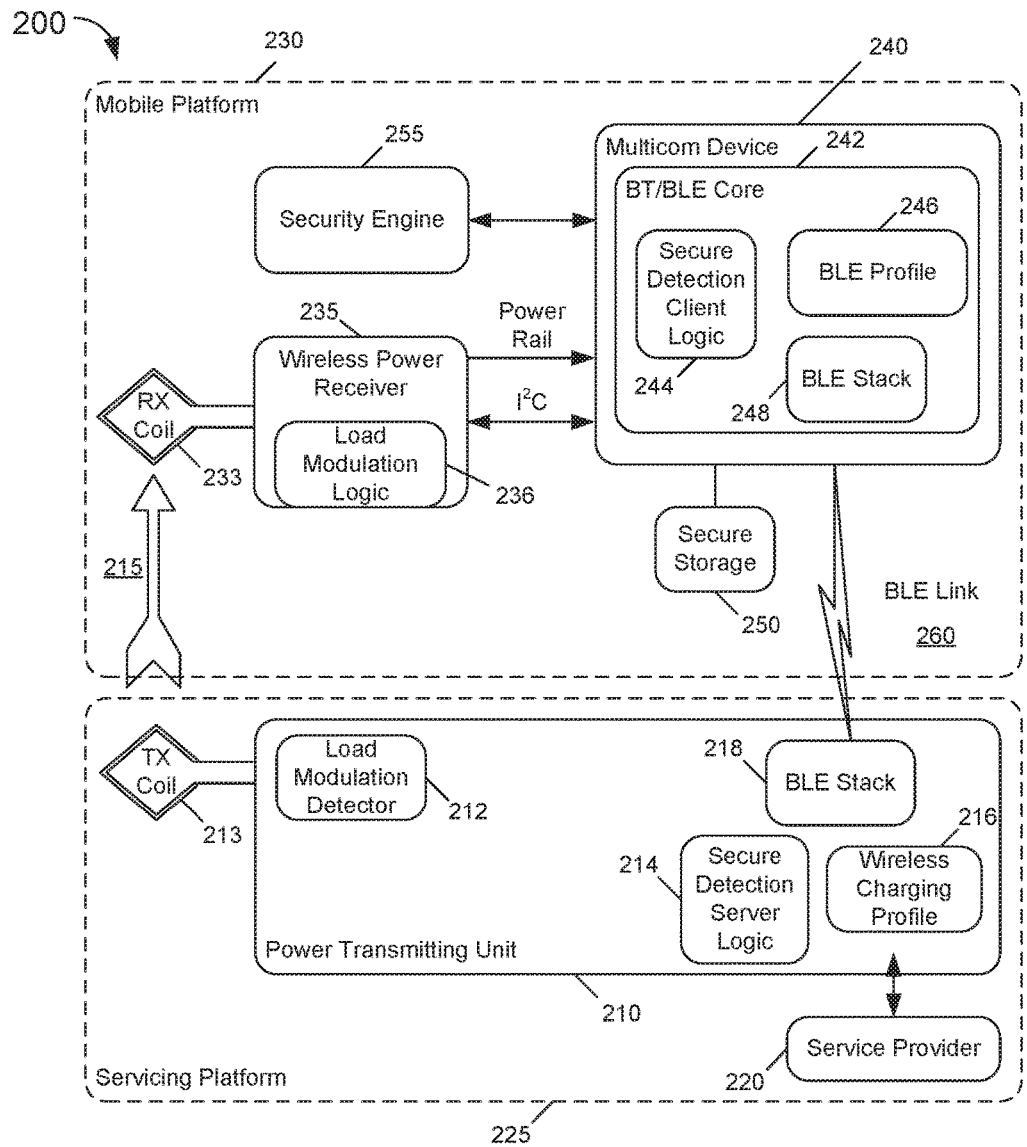
FIG. 2 is a block diagram illustrating further details of a system in accordance with an embodiment.

Referring now to FIG. 2, shown is a block diagram illustrating further details of a system 200 in accordance with an embodiment. As illustrated, a power transmitting unit (PTU) 210 may be implemented within a servicing platform 225, which may be one or more of a wide variety of devices, including a vehicle, home entertainment system or so forth. In embodiments, PTU 210 may be in accordance with an A4WP specification, and which may be used to wirelessly charge a mobile platform 230. In different embodiments, PTU 210 can be implemented either as a stand-alone charging pad/boll or may be embedded into a different mobile platform (such as a laptop with wireless charging capabilities). Servicing platform 225 may further include a service provider 220, which may be given a computing device and/or service to provide functionality and/or perform an operation in connection with mobile platform 230 and/or a user of such mobile platform.

In the illustration shown, PTU 210 includes a secure detection server logic 214, which may include hardware circuitry, including hardware logic, software and/or firmware or combinations thereof, to manage and authenticate identification requests from multiple mobile platforms. As shown, a wireless charging profile 216, which in an embodiment may be implemented as an A4WP profile, and a BLE stack 218, which may be a hardware circuit and related software/firmware to implement BLE-based functionality, also are present. To enable wireless charging and communication via an in-band channel 215, PTU 210 couples to a transmit coil 213. PTU 210 further includes a load modulation detector 212, which may be used to detect load modulation signaling.

In an embodiment, service provider 220 may be any computing system from which the owner of mobile platform 230 desires one or more services. In embodiments, PTU 210 has a secure link (which may be either wireless or wired) to service provider 220, and acts as an authenticator on behalf of service provider 220. In embodiments herein, PTU 210 may securely detect the physical presence of mobile platform 230 using load impedance detection. Responsive to this detection, the devices may use a load modulation technique to create an in-band channel 215 between mobile platform 230 and PTU 210 along with a BLE link 260 for implementing a dual-channel authentication protocol between the two entities. The physical attributes of the in-band channel make it highly immune to eavesdropping and man-in-the-middle attacks, which strengthen the overall security of the protocol. Understand while shown with these particular components within PTU 210, in other cases components that form PTU 210 may be implemented as different components, or a single component to perform wireless charging and communication functionalities as described herein.

In turn, mobile platform 230 includes, in relevant part, a wireless power receiver (WPR) 235 which may be configured to receive wireless energy received via in-band channel 215, by way of a receive coil 233. As will be described herein, wireless power receiver 235 includes a load modulation logic 236, allowing it to send messages over the in-band channel. Wireless power receiver 235 may couple to a multiband communication circuit, referred to herein as a multicom device 240. As further illustrated, multicom device 240 may couple to a security engine 255 and a secure storage 250. In turn, wireless communication, e.g., via a wireless communication channel 260 may occur between multicom device 240 and BLE stack 218. While shown with this high level in the embodiment of FIG. 2, understand that various other components may be present within the different devices. For example, mobile platform 230 may further include one or more processors, system on chip (SoC), memory, storage, other communication devices, camera, display and so forth.

WPR 235 may be configured to harvest wireless energy from a wireless charging power field and convert it to a DC power source that is driven into a charging subsystem (not show for ease of illustration). In addition, as shown in FIG. 2, wireless power receiver 235 may couple via a power rail to directly provide power to power up multicom device 240. Note that in some cases, when mobile platform 230 is proximately located with PTU 210, it may be in a battery-depleted state. In such situations, the charging subsystem's output rail can both charge a battery of mobile platform 230 and directly power up at least certain platform components, particularly including multicom device 240. In an embodiment, mobile platform 230 may include a sequence manager to control the timing in which various platform components are taken out of reset in this state. This sequence manager may ensure that sufficient power is present to directly power multicom device 240 and related components. If it is determined that additional power consumption is available within a power budget, other components of mobile platform 230 may be powered on. If there is not sufficient power budget for other components, only those components directly involved in the authentication protocol may be powered on by the provision of wireless energy received from PTU 210.

In various embodiments, load modulation logic 236 may be used as a signaling mechanism for transmitting messages, including authentication messages as described herein using load modulation over wireless charging in-band channel 215. In an embodiment, load modulation logic 236 may include a hardware controller to control a level of impedance implemented by a load circuit. In an example, this load circuit can be implemented by a parallel-connected set of resistances (which may be included within logic 236, or may be a separate component). As such, message information may be generated by modulation of this impedance (e.g., by controlling a control gate of semiconductor switches (e.g., metal oxide semiconductor field effect transistors (MOSFETs)), either coupled to resistors or that themselves may form the resistances), appropriate signaling may occur. An example of data transfer over load modulation can be as follows: assume a transfer of an 8-bit sequence, the protocol may be defined such that when a logic '1' is to be communicated, load modulation circuit 236 conducts more than a first predetermined power level (e.g., 0.5 Watt (W) and not more than 1.5 W), and when a logic '0' is to be communicated, load modulation circuit 236 conducts less than a second predetermined power level (e.g., 0.1 Watt). Changes in load can be easily detected by load modulation detector 212. In an example for data rate of 200 bits per second, transmitting 8 bits of data will take 40 milliseconds.

In various embodiments, multicom device (MCD) 240 may provide hardware to support one or more local area wireless techniques, including BLE. MCD 240 can be directly powered either from a system rail (not shown) or from a voltage rail of WPR 235. In embodiments herein, the BLE and WPR form together a power receiving unit (PRU) functionality as defined in the A4WP specification.

As further illustrated, multicom device 240 includes a BT/BLE core 242, which may be implemented as combinations of hardware, software and/or firmware to perform BT/BLE communication. As seen, core 242 includes a secure detection client logic 244 (which in one embodiment may be implemented as an application to execute on a microcontroller or other general-purpose processor of multicom device 240). In other cases secure detection client logic 244 may include hardware circuitry, including hardware logic, software and/or firmware or combinations thereof. Core 242 further includes a BLE profile 246, which may be a BLE proximity profile or a vendor specific BLE security profile that defines the communication semantics between the two sides of the channel. Profile 246 may execute on core 242 and manage the authentication process. Core 242 may further include a BLE stack 248 to communicate via BLE link 260 with BLE stack 218.

Note that there may be a number of different techniques to implement the authentication protocol. One technique is to have the PTU transmit a randomly generated challenge over the wireless channel and for the PRU to echo it back over the in-band channel. An enhancement to this technique is to have the PRU encrypt the challenge using a pre-shared key and transmit the result over the in-band channel. Another possibility is for the PRU to transmit a unique identifier over the in-band channel that has been communicated to the PTU during the registration phase. This identifier can also be sent in parallel over the in-band channel and BLE channel. Still further, the PTU may implement a time-based control mechanism for restricting the allowed delay between the two transmissions, to securely perform identifier matching.

Thus embodiments provide a number of different techniques to augment a BLE-based authentication mechanism, creating an enhanced secure authentication flow. After the successful authentication, the servicing platform may enable secure services and functionality that are requested by the owner of the mobile platform.

In some embodiments, secure detection server logic 214 and secure detection client logic 244 can be pre-binded using either BLE standard pairing methods (using one of BT/BLE's defined association methods: numeric comparison, passkey entry or out-of-band) or by an external provisioning method for creating a shared key in both entities.

The pairing phase allows these components to negotiate a shared secret key that will be used during the secure identification phase for encrypting traffic and for transmitting signatures that attest to the identity of the sender. In an embodiment, this shared key may be stored in secure storage 250 directly coupled to MCD 240. Note that MCD 240 may have in some cases a direct and safe link to the platform's security engine 255 that can be used for securely programming secure storage 250 with the shared key.

In one embodiment, a real-time authentication process starts by placing the mobile platform within the wireless charger area. The wireless charger (also referred to as PTU in A4WP) can be implemented in various methods including a charging pad/mat that is embedded into a table or a charging boll within a car or as charging platform embedded into a personal computer.

Until this event occurs, the radios of both the mobile platform and the PTU may be turned off, thus saving power. The PTU can detect the presence of the mobile device using impedance sensing. Once an impedance change is detected, the PTU sends an energy pulse to the PRU and in parallel open its radio and listens to BLE Secure Detection advertisements. This condition provides a true proximity indication that enhances security. In an embodiment, the Secure Detection advertisements may include details regarding a service type published by the PRU (referred to as a service universally unique identifier (UUID)) as part of the advertisement data payload, which can be used by the PTU to make a connection decision. Note that services of BT/BLE protocols are managed as part of a generic attribute profile (GATT) framework that defines semantics for sending messages between a client and a server. As such, a Secure Detection handshaking protocol as described herein can be implemented over a GATT service (namely a Secure Detection service) that is published by the advertisement sent by the PRU.

The power pulse provided by the PTU may be used by the wireless power receiver, which converts it to a DC power supply to directly power the MCD device and the BLE within it. The WPR may also enable at this time the load modulation circuit for transmission of messages to the PTU over the in-band channel.

When the BLE device on the PRU is powered on, it detects the presence of wireless energy (until that event occurred the entire system including its radio can be powered off). The BLE will then start with, e.g., an A4WP registration protocol to allow the mobile platform to receive operational charging power from the PTU for charging the battery and in parallel start running the Secure Detection client.

The secure detection client can establish a secure connection with the BLE in the PTU optionally with the help of the security manager in the BLE stack. In an embodiment, the establishment of the secure connection may be effected by execution of a number of operations between the devices. In one representative example, the following operations may occur:

1. The PRU sends a Secure Detection advertisement packet serving as an identification beacon that will trigger the connection establishment handshaking between the two parties. This packet may include a unique identifier that will later be sent over the in-band channel.
2. The PTU accepts the Secure Detection advertisement only if it detected the physical presence of the device using impedance sensing.
3. The PTU and PRU execute a dual-channel authentication protocol that leverages the in-band A4WP channel as well as the BLE link. This protocol is composed of the following steps. Initially a random challenge is sent from the PTU over the BLE channel. The PRU then echoes the challenge back over the in-band channel. The PRU may optionally also encrypt the challenge using a pre-shared key to further enhance the security of the protocol. The PRU may also attach its unique identifier to the challenge-response message so that the PTU can compare it to the identifier transmitted over the BLE channel. The PTU may implement a time-based protocol for enforcing the receipt of the identifier over the in-band channel within a maximal delay from the receipt of the Secure Detection advertisement packet.
4. The PTU and PRU then start a BLE connection process, during which an authenticated communication channel is set up.
5. After the Secure Detection server in the PTU has successfully authenticated the mobile platform, it communicates the authentication results and their associated authorization level to the service provider over the private secure link between them.
6. The service provider can then unlock access or capabilities such as car engine start, home security unlocking, administrator privileges, etc.
7. The Secure Detection server may also enable the mobile platform at this time to establish a direct link with the service provider, e.g., by supplying it with the credentials over the established BLE channel. Such a link may be implemented over one or more wireless technologies including BLE, BT or WIFI.
8. The Secure Detection server and Secure Detection client may continue to exchange information over the secure BLE link and may set up BLE profiles such as a proximity profile for managing the session's state.

Figure 3:
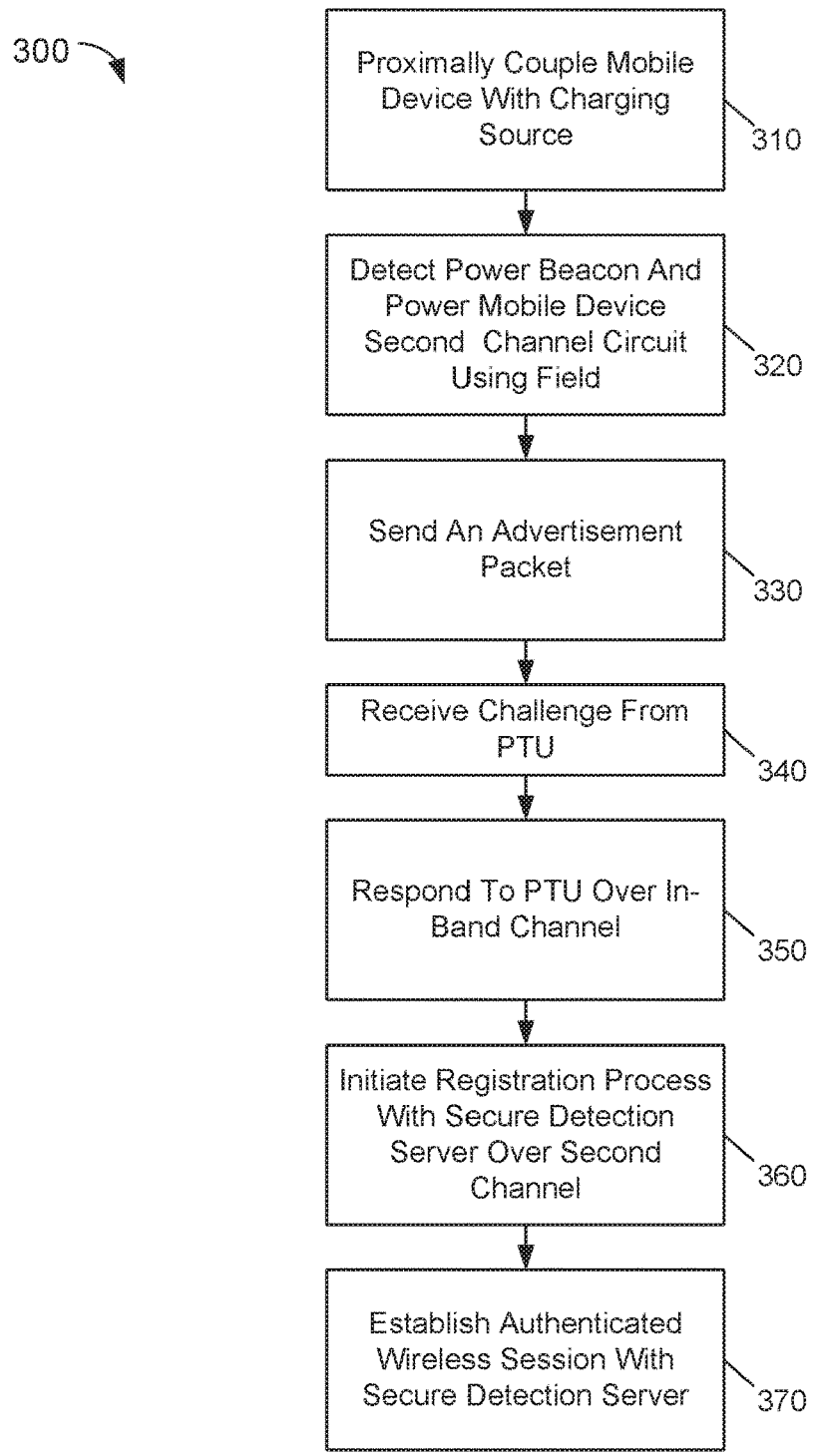
FIG. 3 is a high level view of an authentication protocol method in accordance with an embodiment of the present invention.

Referring now to FIG. 3, shown is a high level view of an authentication protocol method in accordance with an embodiment of the present invention, from the view of an authenticated device, e.g., a mobile platform as described herein. As illustrated, method 300 begins by proximally coupling a mobile device with a charging source (block 310). For example, the mobile device can be placed on a charging pad, within a charging boll, or otherwise proximally located in connection with a charging source. Next at block 320, a power beacon is detected in the mobile device, and a given (second) wireless channel circuit of the mobile device (e.g., a multicom device) may be powered by the wireless field. Thereafter via this second channel, an advertisement packet can be sent (block 330). In one embodiment, this advertisement packet may be a secure detection advertisement packet. Next at block 340, a challenge is received from the PTU. In an embodiment, this challenge may be received via the wireless channel. Next at block 350 a response may be generated and communicated to the PTU over an in-band channel. In one embodiment, this response may be a communication back to the PTU of the challenge. As described herein, in different variations this packet may be encrypted prior to communication. In addition, an identifier, e.g., of the mobile platform, may be included in the communication with this response.

Still referring to FIG. 3, next at block 360, a registration process may be initiated. More specifically, a secure registration process may be performed between secure detection components of the two devices, via the wireless channel. As an example, a standard BLE secure pairing protocol can be executed through which session keys (such as a short term key) are negotiated as well as the security attributes of the session such as encryption mode. After this registration process is completed, control passes to block 370 where an authenticated wireless session can be established with the secure detection components. Understand while shown at this high level in the embodiment of FIG. 3, many variations and alternatives are possible.

Figure 4:
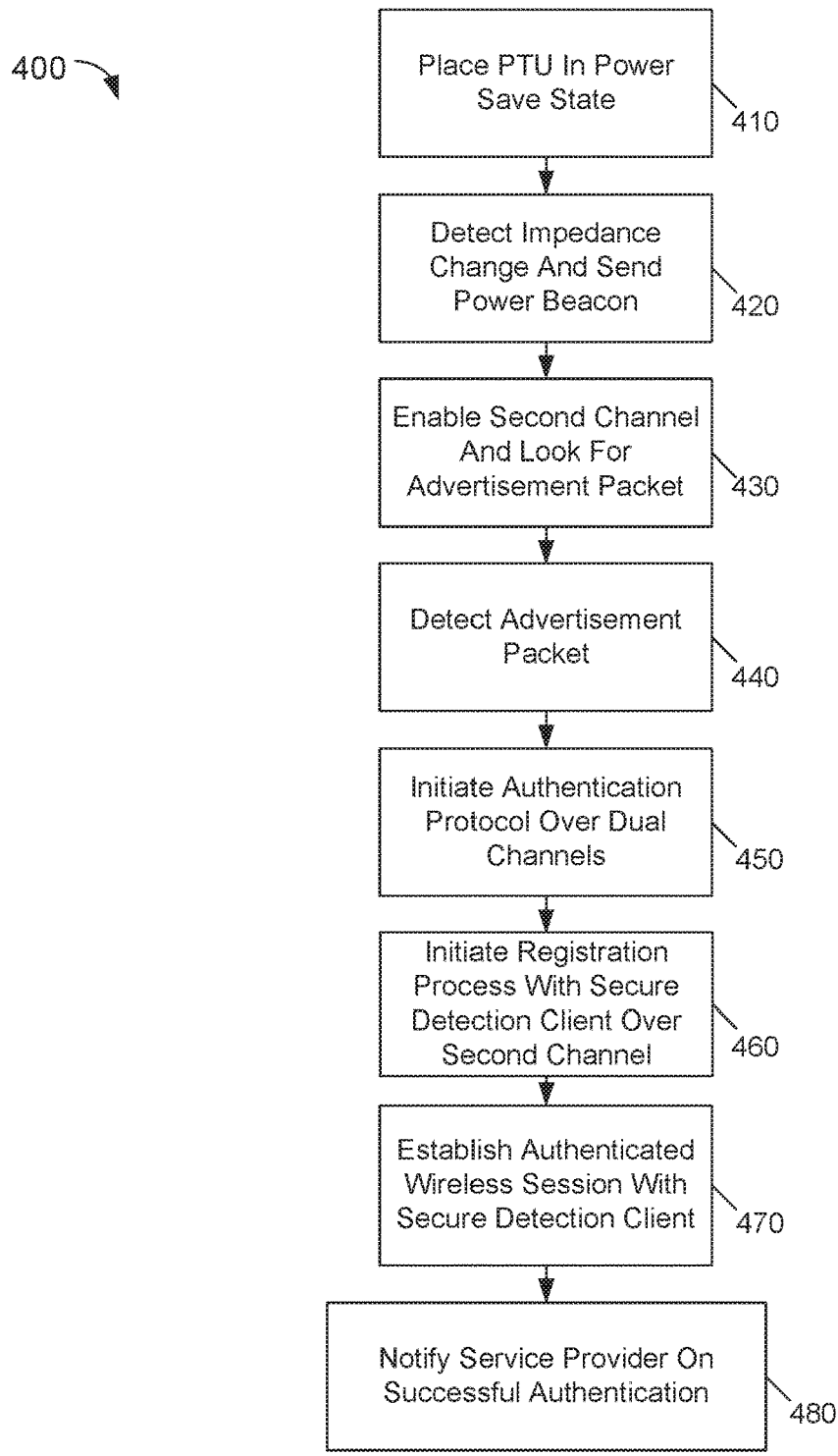
FIG. 4 is a high level view of an authentication protocol method in accordance with an embodiment of the present invention.

Referring now to FIG. 4, shown is a high level view of an authentication protocol method in accordance with an embodiment of the present invention, from the view of an authenticator. As seen, method 400 begins by placing the PTU into a power save state (block 410). Note that this power saving state may occur when no proximal device is detected. Control passes to block 420 where an impedance change is detected. This impedance change thus indicates the proximal presence of a PRU, e.g., of the device to be authenticated. As such further at block 420 a power beacon may be sent from the PTU responsive to this detected impedance change.

Still with reference to FIG. 4 next at block 430, a second communication wireless channel circuit is enabled, and the PTU may wait for receipt of an advertisement packet. Next at block 440, this advertisement packet may be detected. Responsive to detection of the advertisement packet, control passes to block 450 where an authentication protocol may be initiated over both channels. Thereafter, at block 460, a registration process may be initiated. More specifically, a secure registration process may be performed between secure detection components of the two devices as discussed above, via the wireless channel. After this registration process is completed, control passes to block 470 where the authenticated wireless session is established between the secure detection components.

Finally, at block 480, after successful authentication of the authenticated device, the service provider may be notified regarding the successful authentication. As such, a desired event on behalf of a user may be performed by the service provider. Still further, understand that upon successful authentication, one or more credentials may be provided from the authenticator to the authenticated device, to enable secure and direct interaction between the authenticated device and the service provider. Understand while shown at this high level in the embodiment of FIG. 4, many variations and alternatives are possible.

Figure 5:
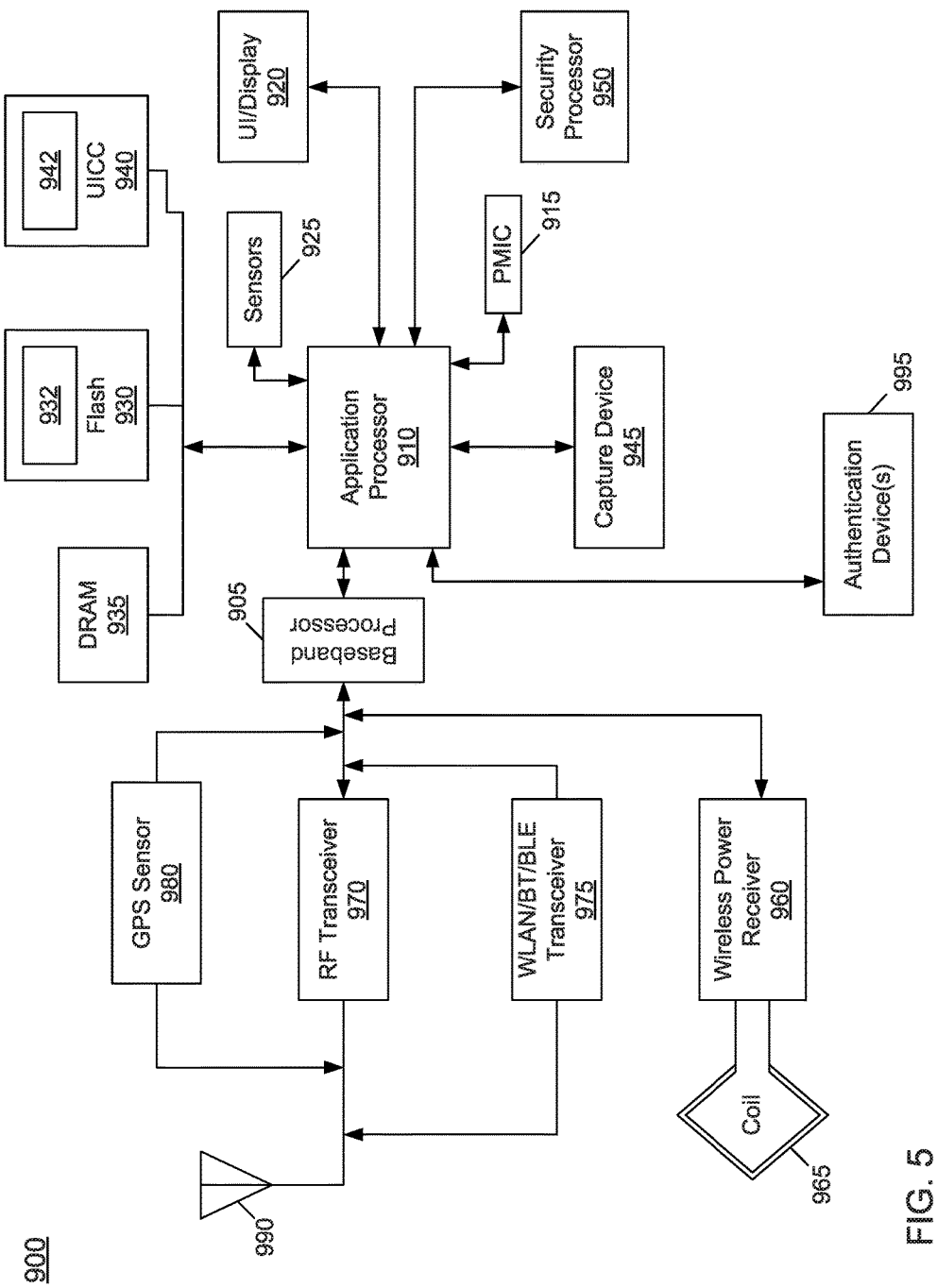
FIG. 5 is a block diagram of an example system with which embodiments can be used.

Referring now to FIG. 5, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 5, a universal integrated circuit card (UICC) 940 comprises a subscriber identity module, which in some embodiments includes a secure storage 942 to store secure user information. System 900 may further include a security processor 950 that may that may implement a trusted execution environment (TEE), and which may couple to application processor 910. Furthermore, application processor 910 may implement a secure mode of operation, such as Intel® SGX to a given instruction set architecture, and circuitry for hosting of a TEE. Security processor 950 and/or application processor 910 may be configured to assist in performing wireless charging-based authentication protocols, as described herein. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a wireless power receiver 960 is provided to receive charging power wirelessly via a receive coil 965. As described herein, wireless power receiver 960 may perform at least portions of a multi-channel authentication protocol with a power transmitting unit, e.g., in connection with communications via one or more of RF transceiver 970 and WLAN/BT/BLE transceiver 975.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received, various circuitry may be coupled between baseband processor 905 and an antenna 990. Specifically, a radio frequency (RF) transceiver 970 and a wireless local area network (WLAN/BT/BLE) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a BT, BLE or IEEE 802.11 standard can also be realized.

Figure 6:
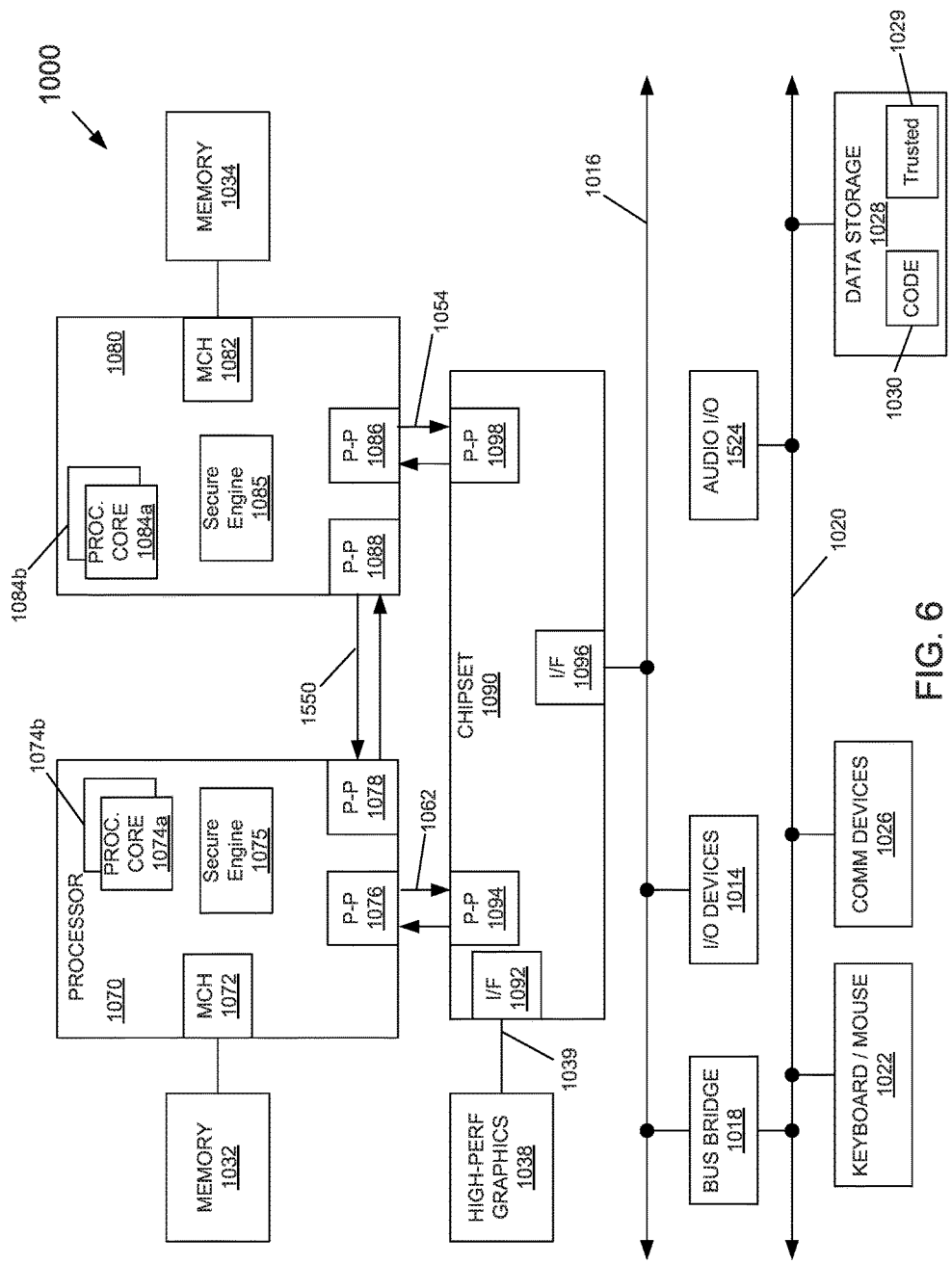
FIG. 6 is a block diagram of a system in accordance with another embodiment of the present invention.

Referring now to FIG. 6, shown is a block diagram of a system in accordance with another embodiment of the present invention that may be used to perform wireless charging. As shown in FIG. 6, multiprocessor system 1000 is a point-to-point interconnect system such as a personal computer system, and includes a first processor 1070 and a second processor 1080 coupled via a point-to-point interconnect 1050. As shown in FIG. 6, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations, including a wireless charging-based multi-channel authentication protocol as described herein.

Still referring to FIG. 6, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 6, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 6, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 6, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 (which may include a WLAN/BT controller to perform in the wireless charging-based authentication described herein) and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 7:
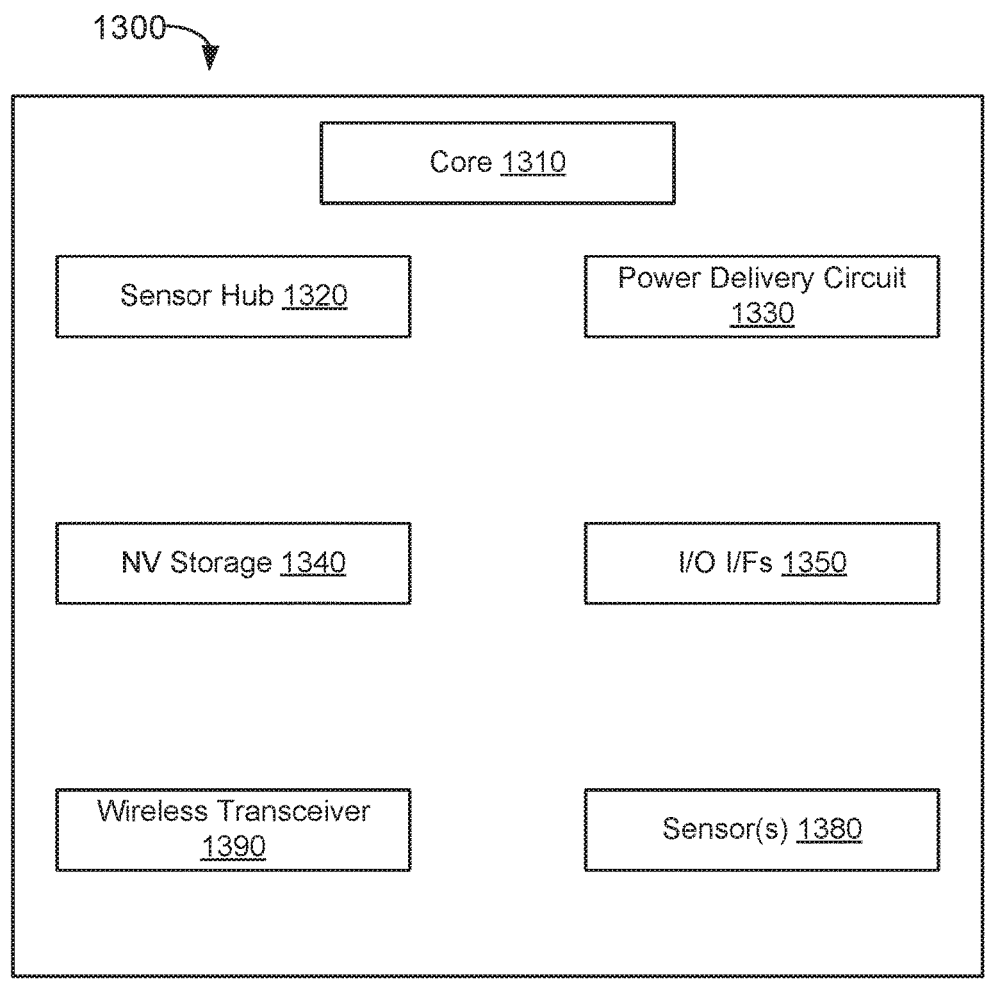
FIG. 7 is a block diagram of a system in accordance with another embodiment of the present invention.

Referring now to FIG. 7, shown is a block diagram of a wearable module 1300 in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly and be used to perform a wireless charging-based authentication protocol as described herein. One or more input/output (IO) interfaces 1350, such as one or more interfaces compatible with one or more of USB/SPI/I2C/GPIO protocols, may be present. In addition, a wireless transceiver 1390, which may be a Bluetooth™ low energy or other short-range wireless transceiver is present to enable wireless charging and authentication protocols as described herein. As one example, wearable module 1300 may be used in a FIDO authentication performed using a wireless charging-based authentication protocol, as described herein. Understand that in different implementations a wearable module can take many other forms.

The following Examples pertain to further embodiments.

In Example 1, a computing device comprises: a power receiving unit to receive energy wirelessly from a power transmitting unit via a receive coil; a load modulation logic to modulate a load coupled to the receive coil to cause a message to be transmitted to the power transmitting unit via a first channel coupled to the receive coil; and a wireless communication circuit to communicate with the power transmitting unit via a second channel.

In Example 2, the computing device is to perform an authentication protocol with the power transmitting unit via the first channel and the second channel.

In Example 3, the computing device of Example 2 further comprises a secure detection client logic to: issue an advertisement packet to the power transmitting unit via the second channel; receive a challenge from the power transmitting unit; and generate a response to the challenge and cause the response to be sent to the power transmitting unit via the first channel.

In Example 4, responsive to authentication of the computing device by the power transmitting unit, the computing device is to establish a secure session with a service provider, using one or more credentials provided from the power transmitting unit.

In Example 5, the power receiving unit is to receive the energy wirelessly and power the wireless communication circuit from an off state to an on state using the energy when the computing device is in an unpowered state, and responsive to authentication of the computing device, the service provider is to perform an action on behalf of a user of the computing device.

In Example 6, in the computing device of one or more of the above Examples the load modulation logic is to control an impedance of the load to generate the message.

In Example 7, the message comprises a response to a challenge message sent from the power transmitting unit to the wireless communication circuit via the second channel.

In Example 8, the power receiving unit of one or more of the above Examples is to receive the energy wirelessly and power the wireless communication circuit from an off state to an on state using the energy.

In Example 9, the computing device of one or more of the above Examples further comprises a power sequence manager to manage activation of one or more components of the computing device during a low battery condition.

In Example 10, the message comprises an identifier of the computing device, and the wireless communication circuit is also to send the identifier to the power transmitting unit via the second channel during a registration process.

In Example 11, a method comprises: after a wireless communication circuit of a mobile platform is powered on responsive to wireless receipt of energy via a first wireless channel from a power transmitting unit in proximity to the mobile platform, sending an advertisement packet via a second wireless channel coupled between the mobile platform and the power transmitting unit; and executing an authentication protocol with the power transmitting unit via the first wireless channel and the second wireless channel, to enable the power transmitting unit to authenticate the mobile platform, where responsive to successful authentication of the mobile platform, the power transmitting unit is to inform a service provider regarding the successful authentication.

In Example 12, the method further comprises receiving a challenge from the power transmitting unit via the second wireless channel and communicating a response to the challenge to the power transmitting unit via the first wireless channel.

In Example 13, the method of Example 12 further comprises encrypting the challenge using a pre-shared key, prior to communicating the response to the power transmitting unit via the first wireless channel.

In Example 14, the method of Example 12 further comprises providing an identifier of the mobile terminal to the power transmitting unit with the response via the first wireless channel.

In Example 15, the method of Example 11 further comprises receiving one or more credentials from the power transmitting unit responsive to the successful authentication, to enable the mobile terminal to interact with the service provider.

In another Example, a computer readable medium including instructions is to perform the method of any of the above Examples.

In another Example, a computer readable medium including data is to be used by at least one machine to fabricate at least one integrated circuit to perform the method of any one of the above Examples.

In another Example, an apparatus comprises means for performing the method of any one of the above Examples.

In Example 16, a system comprises: a power transmitting unit to transmit energy wirelessly to a power receiving unit of a computing device via a transmit coil; a load modulation detection logic coupled to the transmit coil to receive a message communicated by the computing device via a first channel coupled to the transmit coil; and a secure detection logic coupled to the load modulation detection logic to authenticate the computing device based at least in part on the message.

In Example 17, the secure detection logic is to report authentication of the computing device to a service provider, the service provider to perform an action on behalf of a user of the computing device, responsive to the authentication of the computing device.

In Example 18, the power transmitting unit is to transmit the energy wirelessly responsive to detection of proximal presence of the computing device based at least in part on an impedance change within the power transmitting unit.

In Example 19, the power transmitting unit is to cause a second communication circuit to be powered on, responsive to detection of the proximal presence.

In Example 20, the second communication circuit is to communicate one or more credentials to the computing device, responsive to the authentication of the computing device, to enable the computing device to establish a secure connection with the service provider.

In Example 21, the secure detection logic is to authenticate the computing device via the first channel and a second channel coupled between the computing device and the system.

In Example 22, the system comprises a wireless charger for the computing device.

In Example 23, a computing device comprises: means for receiving energy wirelessly from a power transmitting unit via a receive coil; load modulation means for modulating a load coupled to the receive coil to cause a message to be transmitted to the power transmitting unit via a first channel coupled to the receive coil; and wireless communication means for communicating with the power transmitting unit via a second channel.

In Example 24, the computing device of Example 23 further comprises a secure detection client means for: issuing an advertisement packet to the power transmitting unit via the second channel; receiving a challenge from the power transmitting unit; and generating a response to the challenge and cause the response to be sent to the power transmitting unit via the first channel.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computing device comprising:
   a power receiving unit to receive energy wirelessly from a power transmitting unit via a receive coil;
   a load modulation logic to modulate a load coupled to the receive coil to cause a message to be transmitted to the power transmitting unit via a first channel coupled to the receive coil; and
   a wireless communication circuit to communicate with the power transmitting unit via a second channel.

2. The computing device of claim 1, wherein the computing device is to perform an authentication protocol with the power transmitting unit via the first channel and the second channel.

3. The computing device of claim 2, further comprising a secure detection client logic to:
   issue an advertisement packet to the power transmitting unit via the second channel;
   receive a challenge from the power transmitting unit; and
   generate a response to the challenge and cause the response to be sent to the power transmitting unit via the first channel.

4. The computing device of claim 2, wherein responsive to authentication of the computing device by the power transmitting unit, the computing device is to establish a secure session with a service provider, using one or more credentials provided from the power transmitting unit.

5. The computing device of claim 2, wherein the power receiving unit is to receive the energy wirelessly and power the wireless communication circuit from an off state to an on state using the energy when the computing device is in an unpowered state, and responsive to authentication of the computing device, the service provider is to perform an action on behalf of a user of the computing device.

6. The computing device of claim 1, wherein the load modulation logic is to control an impedance of the load to generate the message.

7. The computing device of claim 6, wherein the message comprises a response to a challenge message sent from the power transmitting unit to the wireless communication circuit via the second channel.

8. The computing device of claim 1, wherein the power receiving unit is to receive the energy wirelessly and power the wireless communication circuit from an off state to an on state using the energy.

9. The computing device of claim 1, further comprising a power sequence manager to manage activation of one or more components of the computing device during a low battery condition.

10. The computing device of claim 1, wherein the message comprises an identifier of the computing device, and the wireless communication circuit is also to send the identifier to the power transmitting unit via the second channel during a registration process.

11. At least one computer readable storage medium comprising instructions that when executed enable a mobile platform to:
after a wireless communication circuit of the mobile platform is powered on responsive to wireless receipt of energy via a first wireless channel from a power transmitting unit in proximity to the mobile platform, send an advertisement packet via a second wireless channel coupled between the mobile platform and the power transmitting unit; and
execute an authentication protocol with the power transmitting unit via the first wireless channel and the second wireless channel, to enable the power transmitting unit to authenticate the mobile platform, wherein responsive to successful authentication of the mobile platform, the power transmitting unit is to inform a service provider regarding the successful authentication.

12. The at least one computer readable medium of claim 11, further comprising instructions that when executed enable the mobile platform to receive a challenge from the power transmitting unit via the second wireless channel and communicate a response to the challenge to the power transmitting unit via the first wireless channel.

13. The at least one computer readable medium of claim 12, further comprising instructions that when executed enable the mobile platform to encrypt the response using a pre-shared key, prior to communication of the challenge to the power transmitting unit via the first wireless channel.

14. The at least one computer readable medium of claim 12, further comprising instructions that when executed enable the mobile platform to provide an identifier of the mobile platform to the power transmitting unit with the response via the first wireless channel.

15. The at least one computer readable medium of claim 11, further comprising instructions that when executed enable the mobile platform to receive one or more credentials from the power transmitting unit responsive to the successful authentication, to enable the mobile platform to interact with the service provider.

16. A system comprising:
a power transmitting unit to transmit energy wirelessly to a power receiving unit of a computing device via a transmit coil;
a load modulation detection logic coupled to the transmit coil to receive a message communicated by the computing device via a first channel coupled to the transmit coil; and
a secure detection logic coupled to the load modulation detection logic to authenticate the computing device based at least in part on the message, wherein the secure detection logic is to report authentication of the computing device to a service provider, the service provider to perform an action on behalf of a user of the computing device, responsive to the authentication of the computing device.

17. The system of claim 16, wherein the power transmitting unit is to transmit the energy wirelessly responsive to detection of proximal presence of the computing device based at least in part on an impedance change within the power transmitting unit.

18. The system of claim 17, wherein the power transmitting unit is to cause a second communication circuit to be powered on, responsive to detection of the proximal presence.

19. The system of claim 18, wherein the second communication circuit is to communicate one or more credentials to the computing device, responsive to the authentication of the computing device, to enable the computing device to establish a secure connection with the service provider.

20. The system of claim 16, wherein the secure detection logic is to authenticate the computing device via the first channel and a second channel coupled between the computing device and the system.

21. The system of claim 16, wherein the system comprises a wireless charger for the computing device.

* * * * *